Figure 1:
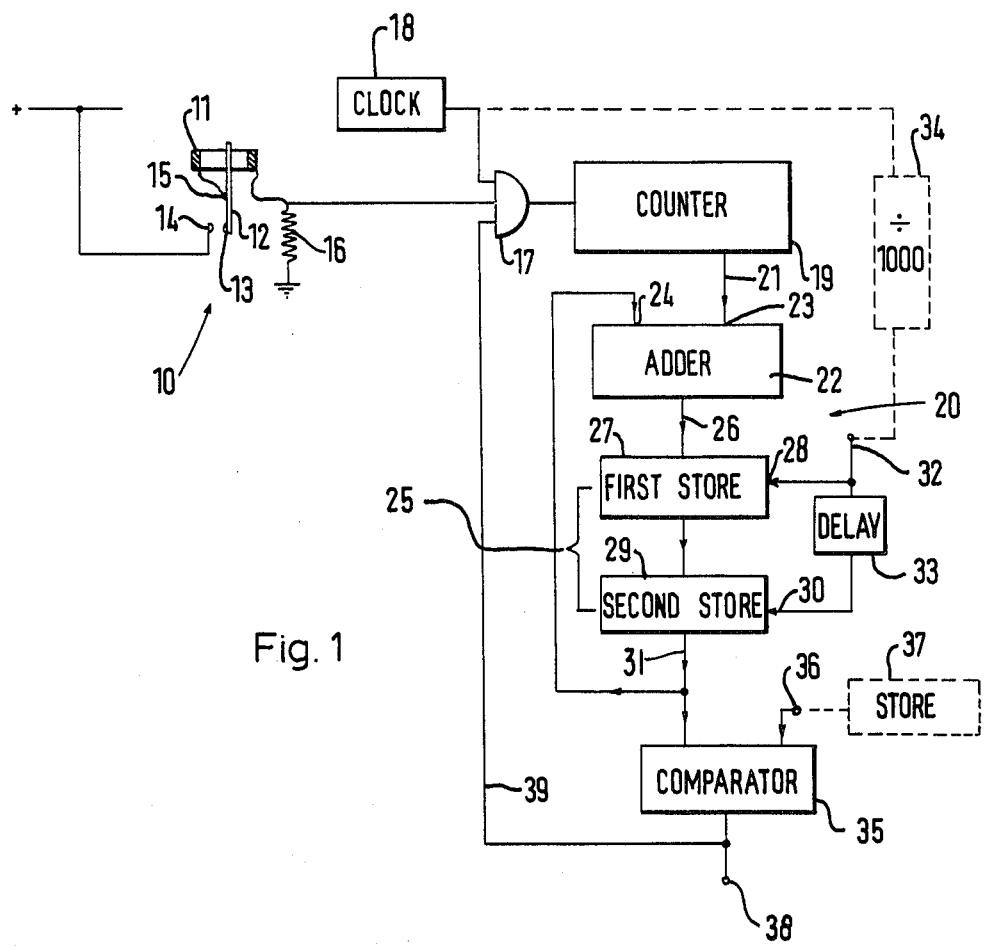

United States Patent [19]

Griffiths et al.

[11] 4,149,417
[45] Apr. 17, 1979

[54] DISTANCE MEASURING ARRANGEMENTS

[75] Inventors: William E. Griffiths, Middleton; Peter M. Williams, New Moston, both of England

[73] Assignee: Ferranti Limited, Hollinwood, England

[21] Appl. No.: 857,699

[22] Filed: Dec. 5, 1977

[30] Foreign Application Priority Data

Dec. 11, 1976 [GB] United Kingdom ...... 51776/76

[51] Int. Cl.² .................... G01C 21/16; G01P 15/02
[52] U.S. Cl. .................................... 73/490; 73/517 R
[58] Field of Search ............ 73/516 R, 517 R, 517 B, 73/490

[56] References Cited

U.S. PATENT DOCUMENTS

| 2,049,129 | 7/1936 | McNeil | 73/517 R |
| 2,846,207 | 8/1958 | Marggraf | 73/517 R |
| 2,940,306 | 6/1960 | Lozier | 73/517 R X |
| 3,901,086 | 8/1975 | Griffiths et al. | 73/490 |

Primary Examiner—James J. Gill
Attorney, Agent, or Firm—Cameron, Kerkam, Sutton, Stowell & Stowell

[57] ABSTRACT

A distance measuring arrangement has an accelerometer transducer of the force balance type in which a switch closed by the action of an acceleration force causes a constant current to flow in a coil to oppose the force and open the switch. The switch opens and closes in a repetitive cycle at the resonant frequency of the system, the closed switch gating clock pulses to integration means. The transducer may take two forms. In the first the proportion of time that the switch is closed in each cycle is proportional to the acceleration value. Distance measurement comprises counting the clock pulses to effect a first stage of integration and summating the counter totals every 1000 clock pulses to give a distance travelled signal. In the second, the proportion of time that the switch is closed in each cycle is proportional to the square root of the acceleration value and distance measuring comprises counting the clock pulses to give a signal proportional to the square root of distance travelled. In both cases this signal may be compared with a stored predetermined value to effect a control function.

11 Claims, 5 Drawing Figures

DISTANCE MEASURING ARRANGEMENTS

This invention relates to distance measuring arragements and in particular to such arrangements which sense acceleration of the arrangement of measure distance travelled by it.

Distance measuring arrangements have been proposed in which an accelerometer provides a signal directly proportional to the acceleration it undergoes and which signal is integrated twice to provide an indication of the distance travelled.

Such an arrangement may be implemented in basic form very simply using analogue techniques but for reliable operation in hostile environments a great deal of extra circuitry is required to maintain stable operation and critical adjustments have to be made on installation and to maintain operation. The result is a complex and expensive arrangement whose accuracy is inherently limited by the adjustments.

These problems may be reduced by resorting to digital techniques, resulting in an arrangement basically more complex but requiring less critical adjustment.

One example of a distance measuring arrangement using digital techniques is described in the applicants' British Patent No. 1,469,764. Briefly, in that arrangement an accelerometer comprises a coil pivotally mounted in a magnetic field and connected to a source of linearly increasing current. The coil is mechanically linked to a switch held closed by an acceleration force to cause the current to be applied to the coil. When the magnitude of current is such that the force it produces in the coil opposes and exceeds that due to acceleration force the switch is opened. The current is caused to increase between zero and an upper limit in a unit time repetitively such that the value of coil restoring torque required to overcome the acceleration force is represented at the proportion of the unit time that the switch is closed. A clock started at the beginning of each unit time period counts until the switch opens and the pulses counted in each unit time represent the acceleration value.

The count per unit time period is fed to summation means where by addition over a number of unit time periods velocity signal is produced and by summation of the velocity signals a further signal is produced representative of the distance travelled.

The above described arrangement satisfies the requirements of minimal adjustments and of stability by taking a digital form, the increasing current to the coil being generated in discrete steps by digital means as well as the integration being by digital summation; but in so doing remains a complex circuit.

It is an object of the present invention to provide a distance measuring arrangement of simplified construction.

According to the present invention a distance measuring arrangement includes accelerometer transducer having an inertial mass, switching means arranged to be operated by the switching means to produce a constant force acting on the inertial mass such that the switching means is opened and closed in a repetitive cycle, the proportion of each cycle for which the switching means causes the coil to be energised being dependent upon the sense and magnitude of an applied acceleration force, said arrangement also including signal means operable to provide in each cycle a signal representing said proportion of each cycle and integration means operable to integrate the signals with respect to time for a plurality of cycles to provide an indication of the distance travelled by the measuring arrangement.

The arrangement may be such that the switching means is operated independently of the action of an acceleration force on the inertial mass, the switching means being operated by a bias force applied to the mass. The bias force may result from the effect of gravity on the inertial mass or by a force produced by the electromagnetic coil in opposition to the force produced when it is energised by the switching means.

The signal means may comprise a source of clock pulses and gating means operable when the switching means is operated to pass clock pulses.

The accelerometer transducer may be of a type in which the electromagnetic coil induces movement of a ferromagnetic material attached to the inertial mass and the proportion of time in each cycle that the switching means causes the coil to be energised is directly proportional to the square-root of the acceleration value, the integration means then comprising a counter operable to add together clock pulses from the signal means. Alternatively the accelerometer transducer may be of a type described in British Patent No. 1,362,121, in which the electromagnetic coil is caused to oscillate in a magnetic field, or as described in co-pending British application No. 51452/74, now British Patent No. 1,500,499, in which a magnet is caused to oscillate in the field of an electromagnetic coil, wherein the proportion of time in each cycle that the switching means causes the coil to be energised is directly proportional to the acceleration value, the integration means comprising a first integration stage comprising a counter of the clock pulses and a second integration stage comprising summation means operable to add together the counter totals for a plurality of cycles of oscillation of the inertial mass at set intervals of time.

There may be included storage means operable to store a signal representative of a function of a preset distance travelled by the accelerometer under the action of a known acceleration force in a predetermined time and comparison means operable when the accelerameter is acted upon by said accelerometer having travelled that preset distance.

The accelerometer may measure accelerations acting in opposite senses. The arrangement may then include gating means operable to separate accelerometer signals relating to the sense of acceleration.

Figure 2:
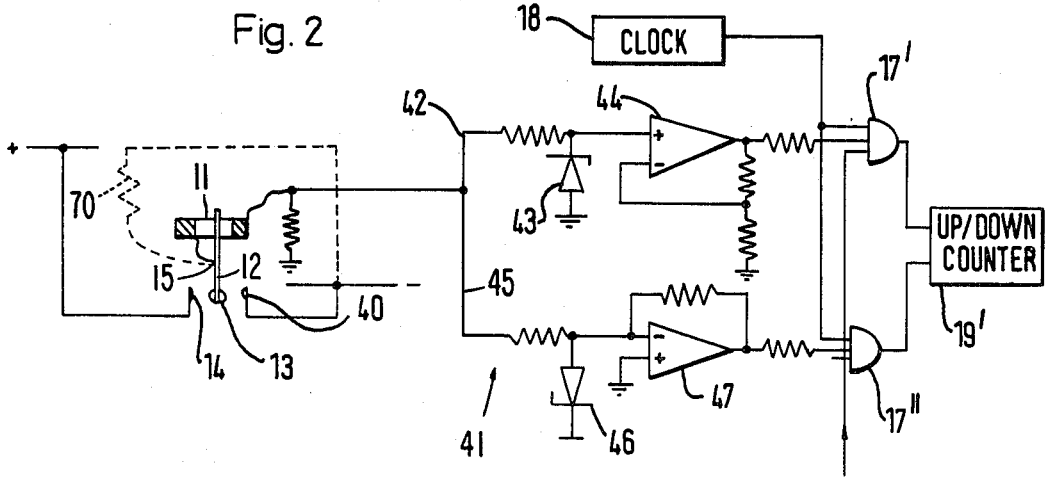
Figure 3:
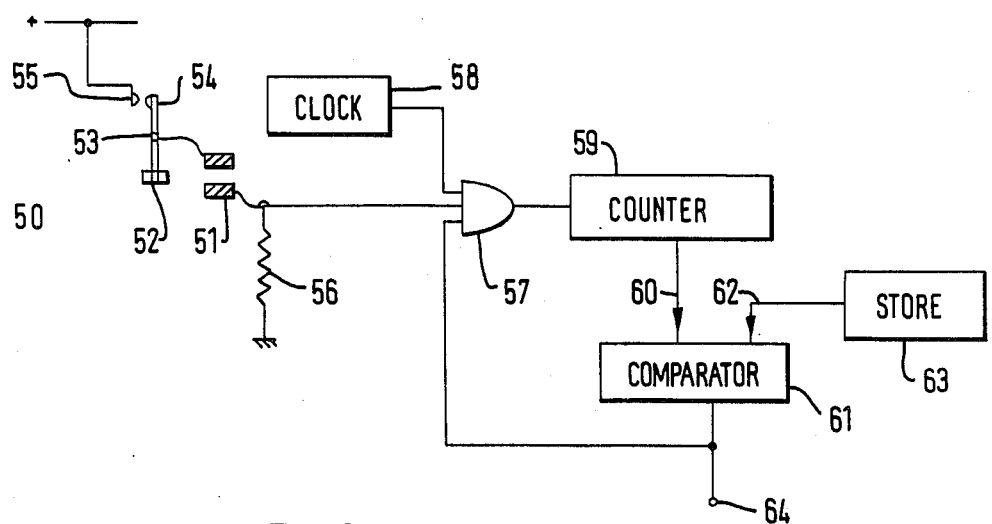

Embodiments of the invention will be described by way of example with reference to the accompanying drawings, in which:

FIG. 1 is a schematic-block diagram of the electrical circuitry of the distance measuring arrangement according to the present invention employing an accelerometer having a linear response, FIG. 2 is a circuit diagram of a modification to the arrangement of FIG. 1 to enable it to measure in two opposite directions, FIG. 3 is a schematic block diagram similar to FIG. 1 but employing an accelerometer having a square-law response.

Figure 4:
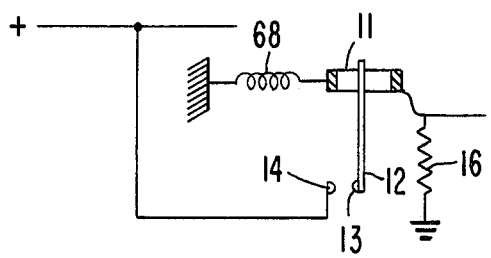
Figure 5:
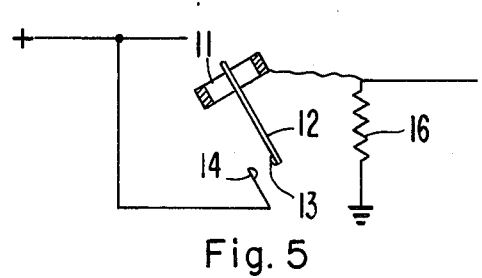

FIG. 4 is a modification of FIG. 1 wherein a spring is added for operation with zero acceleration, and FIG. 5 is another modification of FIG. 1 wherein gravity provides a biasing force for operation with zero acceleration.

Referring to FIG. 1 a distance measuring arrangement comprises a force balance accelerometer shown schematically at 10. The accelerometer transducer is of the type described in British Patent No. 1,362,121 and comprises an electromagnetic coil 11 pivotally mounted in a uniform magnetic field in the manner of a moving coil instrument. An inertial mass comprising an arm 12 is attached to the coil for rotation therewith. The coil is connected to a contact 13 on the arm and, by way of load resistor 16, to earth. The contact 13 comprises one contact of electric switching means which also has a fixed contact 14 connected to a source 15 of potential. The switching means is considered closed when the contacts are engaged and open when they are apart.

When there is no acceleration force acting on the accelerometer the switching means is normally open, that is, the coil is unenergised. When an acceleration force is acting the switching means is forced to close and a current is caused to flow through the coil in such a sense and of such magnitude as to exert a restoring force on the coil and arm to open the switching means. When the current flow ceases the acceleration force causes the switching means to close again and for current to flow thereby setting up a continuous oscillation of the arm in which the switching means is opened and closed in a repetitive cycle.

When current is flowing through the coil a voltage is developed across the resistor and the continuous opening and closing of the switching means causes a voltage pulse train to be produced at the load resistor 16. The repetition period of the pulse train is equal to the period of oscillation of the coil and arm, and the mark-period ratio is directly proportional to the value of the acceleration force. That is, the greater the acceleration force acting on the arm, the greater proportion of time in a cycle that the switching means remains closed.

The voltage appearing on the resistor 16 is fed to one input of gating means 17, together with clock pulses at a much higher frequency from a clock pulse generator 18.

It will be appreciated that for a constant clock frequency the number of clock pulses passed by the gate in any period of time represents the magnitude of the acceleration being undergone by the accelerometer.

The output of the gate is fed to integration means which performs two stages of integration, a first stage being performed by a pulse counter 19 and the second stage being performed by summation means 20. The counter 19 produces an output signal at terminal 21 comprising the increasing total of pulses received from the gate 17 and representing over a period of time the first time integral of the acceleration, that is, the velocity of the accelerometer.

The terminal 21 of the counter provides an input signal to the summation means 20. The summation means comprises addition means 22 having first and second inputs 23 and 24, and a two-part buffer store 25 which is fed by an output 26 of the addition means.

The buffer store comprises a first part 27 arranged to be triggered by a pulse applied to a trigger terminal 28 to receive the contents of the addition means and to provide the stored signal for a second part 29 of the store. The second part 29 is also arranged to be triggered by a pulse applied to a trigger terminal 30 to receive the contents of the first part and feed the contents from an output terminal 31 to the input terminal 24 of the addition means. Both of the trigger terminals are connected to receive a transfer pulse from a transfer terminal 32, the terminal 28 directly and the terminal 30 by way of a delay circuit 33. The effect of the two parts of the store and the delay circuit is that the transfer path between the addition means and the store is closed before a signal from the second part of the store is fed back to the addition means. The transfer signal comprises one of a train of pulses applied at regular time intervals which pulses are derived from the clock 18 by a division circuit shown ghosted at 34 to provide a transfer pulse at, say, every 1000, clock pulses.

The output terminal 31 of the buffer store is fed to one input of a comparator 35 the other input 36 of which is connected to receive a present reference number of a reference store 37. The comparator has an output terminal 38 which is also connected to provide an input to the gate 17 by way of line 39.

In operation of the distance measuring arrangement when the accelerometer is undergoing acceleration the counter 19 gives as an output a continually increasing number, representative of velocity. The number at terminal 21 is applied to the addition means at terminal 23 such that the output of the addition means comprises a number increasing with the number in the counter but which number is not accepted by the buffer store. Any number which is fed to the addition means by the second store is added to the total which thereafter increases with each clock pulse counted.

After a first integration period, set at 1000 clock pulses, a transfer pulse is applied to the terminal 32 which causes the number representing the accumulated total of clock pulses to be transferred to the first part of the buffer store and the input to the store then isolated from the addition means. After the delay period of circuit 33 the number is transferred to the second part of the store and then to the input terminal 24 of the addition means such that the number appearing at its output terminal 26 is increased by the amount previously stored and to which new number subsequent clock pulses are added. At the end of subsequent integration periods similar transfer pulses are applied to the buffer store and the summation continued. Each time that a number is transferred from the second part of the buffer store it represents the summation of the velocity values of the counter totals, that is, it represents the distance travelled by the accelerometer.

The number transferred from the buffer store is applied to one input of the comparator 35 for comparison with the reference number representing a preset value of distance travelled. When the number from the summation means exceed the reference number then a circuit output signal is provided by the comparator which signal closes gate 17 to inhibit the passage of further clock pulses.

The above-described arrangement is suitable only for measuring an acceleration force acting on the accelerometer in a single direction. FIG. 2 shows a modification of the arrangement of FIG. 1 to permit the measurement of distance travelled under the action of acceleration forces in either or both of two directions.

The parts corresponding to those of FIG. 1 are given corresponding reference numerals.

The accelerometer 10 has a second fixed contact 40 connected to a supply of the opposite polarity to the contact 14 such that if an acceleration force acts to the right in FIG. 2 the load resistor develops a succession of positive-going pulses whereas an acceleration force acting to the left develops a succession of negative-going pulses. It will be appreciated that in an environment in which vibrational forces act on the accelerometer any overall acceleration in one direction may comprise components in both directions due to the superimposed vibration and resulting in pulses of both polarity from the load resistor 16.

The pulses are fed to a gating arrangement 41 comprising separate paths for positive-going and negative-going pulses. The pulses of both polarities are fed along path 42 where negative-going pulses are removed by way of diode 43. The retained positive-going pulses are isolated by a non-inverting amplifier 44 and fed to one input of a gate 17'. The pulses from the accelerometer are also fed along a path 45 where a diode 46 removes any positive-going pulses. The retained negative-going pulses are isolated by an inverting amplifier 47 and fed as positive-going pulses to a gate 17". The gates 17' and 17" correspond to the gate 17 of FIG. 1 and receive also an inputs, clock pulses from clock 18 and a stop signal from the comparator. The gate 17' and 17" supply "up" and "down" inputs respectively of an up-down counter 19' similar to the counter 19 of FIG. 1.

The output of the counter feeds summation means identical to that shown in FIG. 1 and which has already been described.

The counter and integrator are arranged to work with "two's complement arithmetic" so that distance travelled in both positive and negative directions with respect to the motion measured by the arrangement of FIG. 1 can be measured. The comparator 35 is also provided with a gating circuit (not shown) so that if a negative predetermined distance (in relation to FIG. 1) is stored by the store 37 the comparator will produce an output if the contents of the second store are less than the predetermined distance whereas if a positive predetermined distance is stored the comparator provides an output if the contents of the second store exceed the predetermined distance.

It will be appreciated that the moving coil type of accelerometer described in the above embodiment may be replaced by an accelerometer of the type described in co-pending application No. 51452/74 in which the electromagnetic coil is fixed and a permanent magnet is caused to oscillate in the field of the coil. Such an accelerometer also gives an output linearly related to acceleration and which may be doubly integrated as described above to measure distance travelled.

FIG. 3 shows an alternative arrangement in which the accelerometer is of a force-balance type having a non-linear relationship between its output and the acceleration force acting upon it.

The accelerometer has a construction and response similar to a moving-iron measuring instrument in that a piece of ferromagnetic material is caused to move in the field of an electromagnetic coil, ether by magnetic attraction of the coil on the material or by repulsion between a ferromagnetic core of the coil and the piece of ferromagnetic material.

The distance measuring arrangement includes an accelerometer 50, comprising an electromagnetic coil 51 and an armature 52 of soft iron, comprising the inertial mass, carried by a pivotally mounted arm 53. The arm comprises a moving contact 54 of an electric switch which engages with a fixed contact 55 when the switch is in a first state and which is spaced from it by a short distance when the switch is in a second state. The fixed contact 55 is connected to a source of potential and the movable contact 54 is connected to one end of the electromagnetic coil. The other end of the coil is connected by way of a load resistor 56 to earth.

The junction of the coil and load resistor is connected to one input of a gate 57, to control the application of pulses from a clock oscillator 58 to a counter 59. The counter provides a single stage of integration by summation of the clock pulses as described above and the accumulated total is fed to one input 60 of a comparator 61. The other input 62 of the comparator is connectd to a store 63 in which a present number may be stored. An output terminal 64 of the comparator is also connected to an input of the gate 57.

The accelerometer functions in the oscillatory manner described for the embodiment of FIG. 1 the acceleration force acting on the armature being balanced by the average magnetic attraction of the coil on the armature. In the case of a moving iron instrument the force exerted on the armature is proportional to the square of the current flow through the coil and it will be appreciated that as applied to an accelerometer the square of the average current flow is proportional to the acceleration force acting on the instrument. The voltage appearing across the load resistor 56 is thus proportional to the square root of the acceleration of the instrument.

Considering the equations of motion of a body, such as the accelerometer, then a body starting from rest with a constant acceleration a travels a distance s in a time t where $s = \frac{1}{2} a t^2$. From this it will be seen that $\sqrt{s} \propto \sqrt{a} \, t$ and that a value representative of $\sqrt{s}$ can be obtained by a single integration of the $\sqrt{a}$ signal with respect to time. That is, a signal can be provided after a time corresponding to a set value of distance s travelled for any value of a.

Thus referring again to FIG. 3, the train of pulses produced by the accelerometer is fed to the gate 57 and opens it for a period of time related to $\sqrt{a}$. The clock pulses applied to the counter for this time are accumulated and the stored total is compared with a preset reference number representing $\sqrt{s}$ and the comparator provides an output signal when a distance s has been travelled, closing the gate 57.

All of the above described embodiments have the advantage of the accelerometer oscillating at its natural frequency and requiring only a simple constant current supply to the accelerometer.

In the above described embodiments provision may be required for operation with zero acceleration. In this case the inertial mass, that is, the arm and moving contact 13 may be based into contact with the contact 14. This may be achieved by employing a spring 68 acting on the coil as is shown in FIG. 4. Alternatively, as is shown in FIG. 5, the FIG. 1 embodiment may be modified by tilting the contact arrangement such that they are moved to the right and effect of gravity on the arm and contact 13 brings them into engagement. The engagement results in rotation of the coil and opening of the switch so that a continuous oscillation is set up. The effect of an acceleration force in the arm results in a variation in the proportion of each oscillation cycle that the switch remains closed. Alternatively, as shown by broken lines in FIG. 2, the switch contacts 13 and 14 may be biased into engagement by means of a bias current caused to flow in the coil 11 from a negative supply rail. The current flows in the opposite direction to that producing opposition to an acceleration force. Suitable protection against direct connection of the +ve and −ve supply rails is provided by a resistor 70.

What we claim is:

1. A distance measuring arrangement including an accelerometer transducer having an inertial mass, switching means arranged to be operated by the inertial mass, and an electromagnetic coil energizable by the switching means to produce a constant force acting on the inertial mass such that the switching means is opened and closed in a repetitive cycle, the proportion of each cycle for which the switching means causes the coil to be energised being dependent upon the sense and magnitude of an applied acceleration force, said arrangement also including signal means operable to provide in each cycle a signal representing said proportion of each cycle and integration means operable to integrate the signals with respect to time for a plurality of cycles to provide an indication of the distance travelled by the measuring arrangement.

2. A distance measuring arrangement as claimed in claim 1 in which the switching means is operated by a bias force applied to the mass in the absence of an acceleration force.

3. A distance measuring arrangement as claimed in claim 2 in which the switching means is arranged to be biased by gravity.

4. A distance measuring arrangemenet as claimed in claim 2 including means operable to cause a current to flow in the electromagnetic coil in such a sense as to produce a bias force in opposition to that produced when the coil is energised by the switching means.

5. A distance measuring arrangement as claimed in claim 1 in which the signal means comprises a source of clock pulses and gating means operable when the switching means is operated to pass clock pulses.

6. A distance measuring arrangement as claimed in claim 5 wherein the accelerometer transducer is of the type in which the electromagnetic coil induces movement of a ferromagnetic material attached to the inertial mass such that the proportion of time in each cycle that the switching means causes the coil to be energised is directly proportional to the square root of the acceleration value, the integration means comprising a counter operable to add together clock pulses from the signal means.

7. A distance measuring arrangement as claimed in claim 5 wherein the accelerometer is of the type in which the electromagnetic coil is caused to oscillate in the field of a magnet, or vice versa, such that the proportion of time in each cycle that the switching means causes the coil to be energised is directly proportional to the acceleration value, in which arrangement the integration means comprises a first integration stage comprising a counter of the clock pulses and a second integration stage comprising summation means operable to add together the counter totals for a plurality of cycles of oscillation of the inertial mass at set intervals of time.

8. A distance measuring arrangement as claimed in claim 7 in which the second integration means comprises an adder circuit arranged to receive the instantaneous total from the counter, a first store connected to the adder to receive when triggered the contents of the first store, a second store connected to the first store to receive the contents of the first store when triggered and to provide an input signal to the adder and a circuit output signal, and delay means responsive to a trigger signal applied to the first store to apply the trigger signal to the second store a predetermined time later such that upon receipt of a trigger signal the number in the adder is buffered by the first and second stores and added to the number in the adder, the output of the second store providing the summation of counter totals over the interval between trigger signals.

9. A distance measuring arrangement as claimed in claim 8 including a pulse divider circuit connected to receive clock pulses from the signal means and produce a trigger signal after a preset number of clock pulses.

10. A distance measuring arrangement as claimed in claim 1 including storage means operable to store a signal representative of a function of a preset distance travelled by the accelerometer under a known acceleration force in a predetermined time and comparison means operable when the accelerometer is acted upon by said acceleration force to produce a signal indicative of the accelerometer having travelled that preset distance.

11. A distance measuring arrangement as claimed in claim 1 in which the accelerometer is arranged to measure accelerations in opposite senses, including gating means operable to separate into separate channels signals from the accelerometer relating to the sense of acceleration.

* * * * *